United States Patent
Günther et al.

(10) Patent No.: US 6,318,075 B1
(45) Date of Patent: Nov. 20, 2001

(54) METHOD AND DEVICE FOR PERIODICALLY DESULPHATING A NITROGEN OXIDE OR SULPHUR OXIDE STORAGE VESSEL WITH RICH/LEAN ENGINE CYLINDER DISTRIBUTION

(75) Inventors: Josef Günther, Affalterbach; Andreas Hertzberg, Stuttgart; Christof Schön; Ralph Stetter, both of Remshalden; Dirk Voigtländer, Korntal-Münchingen, all of (DE)

(73) Assignee: Daimler Chrysler AG, Stuttgart (DE)

( * ) Notice: Subject to any disclaimer, the term of this patent is extended or adjusted under 35 U.S.C. 154(b) by 0 days.

(21) Appl. No.: 09/522,091

(22) Filed: Mar. 9, 2000

(30) Foreign Application Priority Data

Mar. 10, 1999 (DE) .............................................. 199 10 503

(51) Int. Cl.⁷ ..................................................... F01N 3/00
(52) U.S. Cl. ............................... 60/285; 60/274; 60/277; 60/295; 60/300
(58) Field of Search ............................. 60/285, 286, 295, 60/301, 274, 277, 300

(56) References Cited

U.S. PATENT DOCUMENTS

| | | | |
|---|---|---|---|
| 5,577,382 | * 11/1996 | Kihara et al. ........................... | 60/277 |
| 5,715,679 | * 2/1998 | Asanuma et al. ...................... | 60/285 |
| 5,758,493 | * 6/1998 | Asik et al. ............................... | 60/297 |
| 6,012,428 | * 1/2000 | Yano et al. ............................. | 123/443 |
| 6,014,859 | * 1/2000 | Yoshizaki et al. ..................... | 60/285 |
| 6,151,890 | * 11/2000 | Hoshi .................................... | 60/285 |

FOREIGN PATENT DOCUMENTS

| | | |
|---|---|---|
| 195 22 165 | 12/1995 | (DE) . |
| 197 47 222 | 3/1999 | (DE) . |
| 198 02 631 | 7/1999 | (DE) . |
| 0503882 | * 9/1992 | (EP) . |
| 0580389 | * 1/1994 | (EP) . |
| 0 636 770 | 2/1995 | (EP) . |
| 8-61052 | 3/1996 | (JP) . |
| 8-189388 | 7/1996 | (JP) . |
| 98/27322 | * 6/1998 | (WO) . |

OTHER PUBLICATIONS

Strehlau, W. et al., "New Developments in Lean Nox Catalysis for Gasoline Fueled Passenger Cars in Europe," Sae International, International Fall Fuels & Lubricants Meeting & Exposition, San Antonio, Texas, Oct. 14–17, 1996, pp. 1–26.

* cited by examiner

Primary Examiner—Thomas Denion
Assistant Examiner—Diem Tran
(74) Attorney, Agent, or Firm—Kenyon & Kenyon

(57) ABSTRACT

A method and apparatus for periodically desulphating a nitrogen oxide or sulphur oxide storage vessel of an exhaust emission control system of a multi-cylinder internal combustion engine, in which an engine exhaust emission containing reducing agent and oxygen is fed to the nitrogen oxide or sulphur oxide storage vessel by setting a rich fuel/air ratio for a first subset of the engine cylinders and a fuel/air ratio which is, in comparison, leaner for the other cylinders. The distance between the fuel/air ratio for the first subset of the engine cylinders and that for the second subset of the engine cylinders is set higher in an initial storage vessel heating-up phase than in the subsequent desulphation mode, and/or control errors of the entire fuel/air ratio are eliminated by a predefinable set point value by modifying the fuel/air ratio either of just the first subset or just the second subset of the engine cylinders. Used, for example, in motor vehicles.

8 Claims, 1 Drawing Sheet

METHOD AND DEVICE FOR PERIODICALLY DESULPHATING A NITROGEN OXIDE OR SULPHUR OXIDE STORAGE VESSEL WITH RICH/LEAN ENGINE CYLINDER DISTRIBUTION

BACKGROUND OF THE INVENTION

1. Field of the Invention

The invention relates to a method for periodically desulphating a nitrogen oxide or sulphur oxide storage vessel of an exhaust emission control system of a multi-cylinder internal combustion engine and to a device for carrying out such a method.

2. Description of Related Art

Exhaust emission control systems having a nitrogen oxide ($NO_x$) storage vessel, such as a $NO_x$ adsorber catalytic converter, and optionally a sulphur oxide ($SO_x$) storage vessel which is connected upstream of the latter, such as a so-called $SO_x$ trap, are used in particular in motor vehicles in order to minimize the emission of nitrogen oxide from the internal combustion engine of the motor vehicle. For this purpose, it is known to buffer nitrogen oxide in the $NO_x$ storage vessel in engine operating phases with increased formation of nitrogen oxide, such as lean mode, for example by means of an adsorption process, so that it can be released again and converted in a suitable, later operating phase, such as rich mode, for example by means of an appropriate desorption process and subsequent reduction to form nitrogen oxide. Lean and rich modes are usually to be understood in this context as operation of the engine with a lean, or respectively rich, engine fuel/air ratio, i.e. a fuel/air ratio of the fuel/air mixture combusted in the engine which lies above or below the stoichiometric value.

A known difficulty of such systems consists in the fact that, particularly in the lean mode of the engine, sulphur dioxide is present in the exhaust emission owing to sulphur which is contained in customary fuels and engine oils, which sulphur dioxide can lead, as a result of the formation of sulphates, to sulphur poisoning of the $NO_x$ storage vessel which reduces its $NO_x$ storage capacity. It is therefore known to subject the $NO_x$ storage vessel to a desulphation process whenever there is a perceptible reduction in its $NO_x$ storage capacity, in order to remove the sulphate which has accumulated. Alternatively, the $NO_x$ storage vessel has a $SO_x$ trap upstream of it which is then subjected to a periodic desulphation in an analogous way.

In order to achieve effective desulphation of the nitrogen oxide or sulphur oxide storage vessel, it is known to set increased exhaust emission temperatures of, for example, over 600° C. and a rich storage vessel fuel/air ratio, i.e. one which lies below the stoichiometric value, in which case the term storage vessel fuel/air ratio is to be understood to be the ratio of oxygen or air to fuel and/or non-combusted hydrocarbons in the exhaust emission which is fed to the storage vessel. The setting of such conditions is given, for example, in the publication W. Strehlau et al., New Developments in Lean $NO_x$ Catalysis for Gasoline Fueled Passenger Cars in Europe, SAE 96 2047, 1996.

The German Laid-Open Publication EP 0 636 770 A1 proposes, for the desulphation of a $NO_x$ adsorber catalytic converter, that the internal combustion engine should be reset from a lean engine fuel/air ratio to a rich one, and that when necessary an electric heating device which is assigned to the $NO_x$ adsorber should additionally be activated. The desulphation phase is maintained in each case for a specific time period of approximately 10 minutes.

As a further method in addition to setting a rich engine fuel/air ratio, it has been proposed to make oxygen available in the storage vessel which is to be desulphated, by feeding in secondary air, see the older, non-pre-published German Patent Application 198 02 631.5 (now post-published as Patent DE 198 02 631 C1) and the Patent DE 197 47 222 C1.

The German Laid-Open Publication DE 195 22 165 A1 discloses, in addition to procedures of a different kind, various methods and devices of the type mentioned at the beginning in which, in order to desulphate a $NO_x$ adsorber catalytic converter, at least a subset of the engine cylinders are operated with a rich mixture and the other engine cylinders are operated with one which is leaner in comparison, preferably with a lean engine fuel/air ratio. Insofar as this is possible, this is carried out in that the quantity of fuel for the cylinders which are operated with a lean mixture is reduced while the quantity of air remains constant, while the quantity of air for the cylinders which are operated with a rich mixture is reduced while the quantity of fuel is kept constant. The fuel/air ratio for the cylinders which are operated with a lean mixture here is set larger, by a correction absolute value which can be predefined as a function of the engine operating point, than a desired, predefined overall fuel/air ratio, and the fuel/air ratio for the cylinders which are operated with a rich mixture is set lower, by the same correction absolute value, than the desired overall fuel/air ratio. As an accompanying measure, the ignition time for the cylinders which are operated with a lean mixture is adjusted in the advanced direction and that for the cylinders which are operated with a rich mixture is adjusted in the retarded direction. Subsequently, the intake air quantity is corrected in such a way that a desired engine torque is maintained. In a first variant of the method, a stoichiometric or slightly rich overall fuel/air ratio is set over the entire desulphation period. In a second variant of the method, a stoichiometric overall fuel/air ratio is set during an initial storage vessel heating-up phase, and during a subsequent desulphation mode a rich overall fuel/air ratio is set after a predefinable desulphation temperature has been reached. In both cases, the oxygen which is necessary for the oxidation of reducing agent in order to generate heat is supplied in the exhaust emission by means of the cylinders which are operated with a lean mixture, with the result that the need to supply secondary air is eliminated.

SUMMARY OF THE INVENTION

It is an object of the invention to make available a method and a device for periodically desulphating a nitrogen oxide or sulphur oxide storage vessel of an exhaust emission control system of a multi-cylinder internal combustion engine wherein a nitrogen oxide or sulphur oxide storage vessel can periodically be desulphated in an effective way.

These and other objects of the invention are achieved by providing for a rich/lean spread, i.e. the distance between the rich fuel/air ratio for one subset of cylinders and the fuel/air ratio which is leaner in comparison for the other subset of cylinders to be selected in a variable way during the desulphation period as a function of the temperature, this distance being set larger in an initial storage vessel heating-up phase than in the subsequent desulphation mode after a predefinable desulphation temperature has been reached. The change in the rich/lean spread can advantageously be changed incrementally in two or more stages or alternatively in the form of a function which increases continuously as the storage vessel temperature rises. The larger rich/lean spread at the beginning promotes high contents of oxygen and reducing agent in the exhaust emission and thus rapid heating up of the storage vessel, while the reduction of the fuel/air ratio spread distance as the storage vessel temperature becomes higher avoids overheating of the storage vessel, at the same as which efficient utilization of fuel can be achieved over the entire desulphation period, and the torque can very largely be kept constant as desired.

BRIEF DESCRIPTION OF THE DRAWINGS

Advantageous embodiments of the invention are illustrated in the drawings and described below. In said drawings.

DETAILED DESCRIPTION OF THE INVENTION

Figure 1:
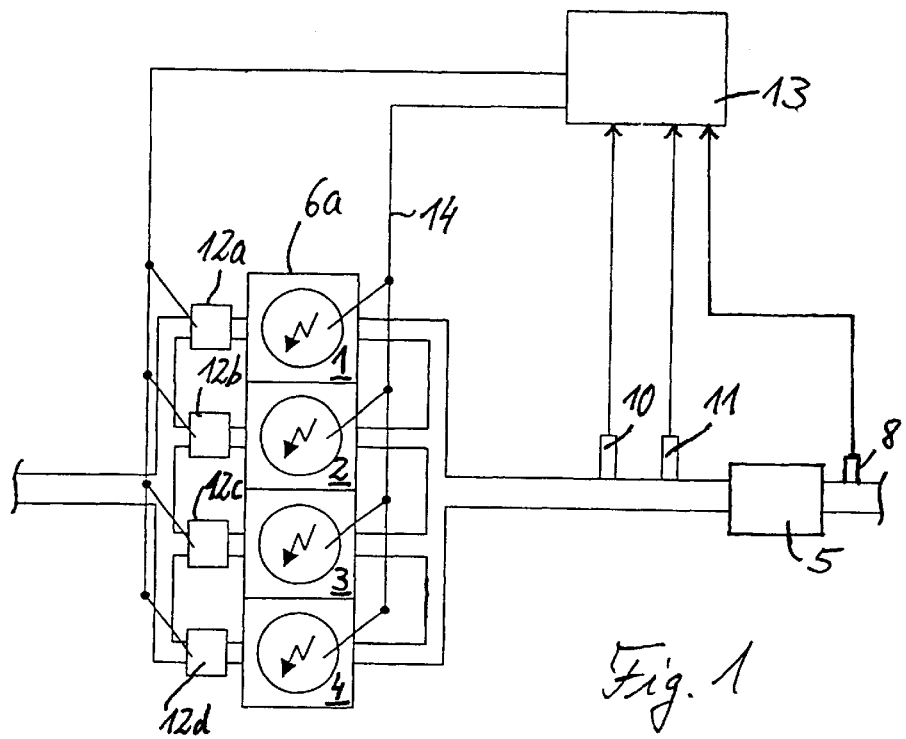
FIG. 1 shows a schematic block diagrammatic view of an internal combustion engine system with $NO_x$ adsorber catalytic converter and a cylinder-specific air-quantity controller.

During the desulphation period, the overall fuel/air ratio which results from the combination of the cylinders operated with the rich mixture and a leaner mixture in comparison is regulated to a desired set point value by virtue of the fact that either just the fuel/air ratio of the cylinders operated with a rich mixture or just the fuel/air ratio of the cylinders operated with a leaner mixture in comparison is set variably and the respective other fuel/air ratio is kept constant. The effect of this is that regulating the fuel/air ratio is significantly simpler in comparison to procedures in which the fuel/air ratio is set variably for each cylinder during the desulphation. In this context, the set point value of the overall fuel/air ratio can be kept constant over the desulphation period or can be predefined in a variable way. For example, as the temperature of the storage vessel rises, said set point value can be varied incrementally or continuously in the rich direction. In this way it is possible to provide for the set point value of the entire fuel/air ratio to be set to approximately the stoichiometric value during an initial storage-vessel heating-up phase and to be set to a value in the rich range for a subsequent desulphation mode after a predefinable desulphation temperature has been reached. When an approximately stoichiometric set point value is selected, an optimum degree of efficiency of a three-way catalytic converter which is integrated with the nitrogen oxide or sulphur oxide storage vessel or connected downstream of it is ensured in the storage-vessel heating-up phase, and optimum exhaust emission control is thus ensured.

Different quantities of air, i.e. cylinder charges, are used during the desulphation, for the subset of the cylinders which is operated with a rich mixture on the one hand and for the subset of the cylinders which is operated with a lean mixture on the other. This can be achieved, for example, by means of separate throttle valves or an individual inlet valve controller for the subset of the cylinders operated with a rich mixture and for the subset of the cylinders operated with a lean mixture, respectively. In comparison to the use of identical quantities of air, in this case a small difference in the quantity of fuel to be injected is sufficient to achieve a desired differential absolute value between the fuel/air ratios for the subset of the cylinders which are operated with a rich mixture and for the subset of the cylinders which are operated with a lean mixture, respectively. Specifically, in comparison with stoichiometric operation of all the cylinders, an identical engine operating point is respectively required, and an at maximum approximately equally large quantity of air and a relatively large quantity of fuel is selected for the subset of the cylinders which is operated with a rich mixture, and an at maximum approximately equally large quantity of fuel and a relatively large quantity of air is selected for the subset of the cylinders which is operated with a lean mixture. The torque which is output by the engine can be regulated here by means of the degree of cylinder charging so that an ignition time which is optimum for the respective fuel/air ratio can always be selected.

The same quantities of air are used for the cylinders operated with a rich mixture and for the cylinders operated with a lean mixture, with the result that one common air quantity controller is sufficient for all the cylinders. The quantity of air is selected here to be larger than at the same engine operating point during normal stoichiometric operation, while a quantity of fuel which corresponds at maximum to approximately the stoichiometric operation is selected for the cylinders operated with a lean mixture, and a quantity of fuel which is larger in comparison, in conjunction with an adjustment of the ignition time in the retarded direction, is selected for the cylinders operated with a rich mixture. The adjustment of the ignition time in the retarded direction avoids excessive generation of torque by the cylinders operated with a rich mixture, and additionally increases the exhaust emission temperature, which promotes rapid heating up of the nitrogen oxide and/or sulphur oxide storage vessel to the desired desulphation temperature.

Figure 2:
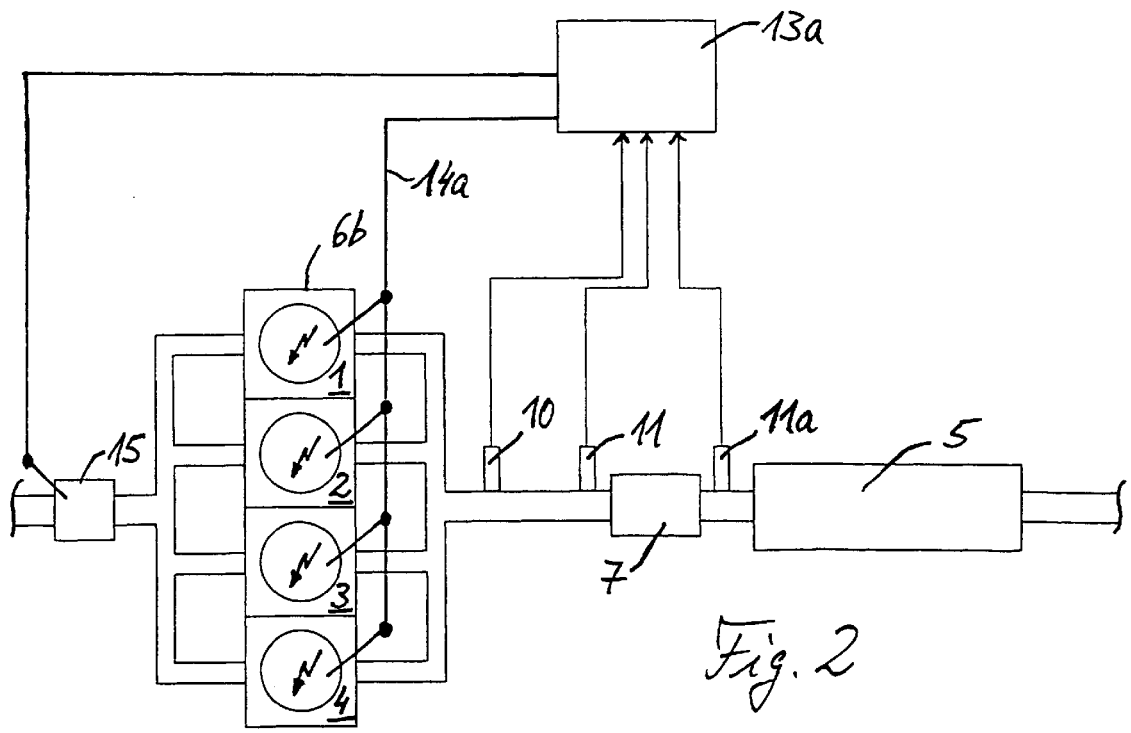
FIG. 2 shows a schematic block diagrammatic view of an internal combustion engine system with a $NO_x$ adsorber catalytic converter, a $SO_x$ trap connected upstream of the latter and a uniform air-quantity controller.

The internal combustion engine systems illustrated in FIGS. 1 and 2 can be used, for example, in motor vehicles and each contain, for example, a four-cylinder internal combustion engine 6a, 6b with associated exhaust emission control system. The exhaust emission control system contains not only possible further components which are not of further interest here and are therefore not shown, but also a $NO_x$ adsorber catalytic converter 5 as nitrogen oxide storage vessel, in order to store, during adsorption phases, nitrogen oxides which are contained in greater quantities in the exhaust emission in lean-operation phases of the internal combustion engine, and desorb them again in periodically implemented desorption phases and convert them into nitrogen, for example by setting a reducing atmosphere or by feeding back the emission. However, at the same time, it is precisely also in lean mode that, owing to sulphur in the fuel or engine oil, sulphate is formed in the $NO_x$ adsorber 5 by sulphur dioxide ($SO_2$) contained in the exhaust emission. The sulphates which are formed cover the material of the adsorber catalyst and thus reduce its $NO_x$ storage capacity. After, typically, 50 to 100 adsorption/desorption cycles, the $NO_x$ storage capacity is reduced to such an extent that it is expedient to perform regeneration in the form of a desulphation period which is then respectively implemented.

The reduction of the $NO_x$ storage capacity of the $NO_x$ adsorber 5 can be detected, for example with a $NO_x$ sensor arranged downstream of it, by virtue of the fact that the $NO_x$ concentration measured by it rises very rapidly during the adsorption phase. Alternatively, the $NO_x$ storage capacity can also be detected by analysing the regeneration period, i.e. the time period required for the respective desorption, which can also be determined, for example, with a lambda probe which is arranged downstream of the $NO_x$ adsorber 5. With a constant engine operating point, this regeneration period is proportional to the stored $NO_x$ mass, with the result that the latter can be determined with reference to the regeneration period which is detected. In parallel to this, the $NO_x$ mass which is buffered in the lean-operation phase of the engine, i.e. the adsorption phase of the $NO_x$ adsorber 5 can be calculated, for example, with an associated adsorber catalytic converter model, from which the regeneration period which is theoretically necessary can be determined as a function of the operating point. If the regeneration period which is determined in this way deviates markedly from the one measured, it is possible to infer that the $NO_x$ storage capacity is reduced.

A further possible way of protecting the $NO_x$ adsorber catalytic converter 5 against severe sulphur poisoning comprises connecting upstream a so-called $SO_x$ trap as a sulphur oxide storage vessel. Such a $SO_x$ trap 7 is provided, for example, in the internal combustion engine system of FIG. 2. The $SO_x$ trap 7 binds the $SO_x$ contained in the engine exhaust emission in the form of adsorbed sulphates. Of course, the $SO_x$ storage capacity of the $SO_x$ trap 7 is limited so that during continuous operation of the internal combustion engine system it must be periodically desulphated in order to reactivate its $SO_x$ storage capacity.

The periodic desulphation both of the $NO_x$ adsorber 5 without an upstream $SO_x$ trap, as in FIG. 1, and of the $SO_x$ trap 7 in FIG. 2 can be carried out under the same operating conditions, and they are therefore treated together below. Suitable desulphation conditions are known to be in this context a temperature which is raised in comparison with normal operation, in particular in partial-load operation, of the engine exhaust emission which is fed to the $NO_x$ adsorber 5 or to the $SO_x$ trap 7, of typically 550° C. to 700° C., and a rich exhaust emission composition, i.e. a sub-stoichiometric storage-vessel fuel/air ratio of less than 1. Storage-vessel fuel/air ratio is to be understood in this context as the ratio of oxygen which has an oxidizing effect to reducing agent which has a reducing effect in the exhaust emission fed to the $NO_x$ adsorber 5 or to the $SO_x$ trap 7, respectively. Analogously, the term engine fuel/air ratio refers to the fuel/air ratio of the fuel/air mixture burnt in the respective cylinder of the engine.

The reduction in the $SO_2$ storage capacity of the $SO_x$ trap 7 can be calculated, for example, by means of a suitable model by estimating the $SO_2$ content of the exhaust emission and calculating as a function of the operating state the quantity of $SO_2$ stored per time unit. By predefining a maximum admissible $SO_2$ load status of the $SO_x$ trap 7 it is then possible to determine in each case the time for the activation of a desulphation period for the $SO_x$ trap 7. The desulphation conditions below are characteristically brought about solely by measures involving the engine, in particular the oxygen which is required to oxidate reducing agent in the $NO_x$ and/or $SO_x$ storage vessel 5, 7 which is to be desulphated in order to reach and maintain the required, raised desulphation temperature, is made available by the engine 6a, 6b itself, without, for example, requiring secondary air to be blown in. For this purpose, a first part of the multi-cylinder internal combustion engine 6a, 6b is operated with a rich mixture in order to make available the necessary reducing agents, in particular non-combusted hydrocarbons, CO and $H_2$, in the exhaust emission, while the other engine cylinders are operated with a sufficiently lean mixture that their exhaust emission contains all the oxygen which is required.

A portion of the oxidation reaction can already take place in the gas phase when the oxygen-containing stream of exhaust emission is combined with the stream of exhaust emission containing the reducing agent, but it is accelerated to a very large extent by the noble-metal catalytic material which is usually present in the $NO_x$ absorber 5 or the $SO_x$ trap 7, and in addition a virtually complete conversion of the oxidizing agent and reducing agent can be achieved at said material. In order to achieve the greatest possible release of heat directly at the nitrogen oxide and/or sulphur oxide storage vessel 5, 7 which is to be desulphated, it is expedient to keep the lean stream of exhaust emission and the rich stream of exhaust emission separated from one another as long as possible. In the schematically shown examples of a four-cylinder engine, this can be achieved by means of an exhaust emission tract which is configured with a dual flow upstream of the $NO_x$ adsorber 5 or of the $SO_x$ trap 7, and, given the customary ignition sequence 1-3-4-2 of the four cylinders 1 to 4 numbered in the figures, cylinders 1 and 4, and respectively cylinders 2 and 3 are operated in pairs, the one pair of cylinders with a rich mixture and the other pair of cylinders with a leaner mixture in comparison.

This concept of dividing up all the engine cylinders into a first subset of ones with rich mixture during a respective desulphation period, and a second subset of cylinders which are operated with a leaner mixture during this period can be applied in the same way for multi-cylinder engines with a number of cylinders other than four. In the case of engines of the V type, it is appropriate to divide the cylinders into banks, i.e. during the desulphation one of the cylinder banks is operated with a rich mixture and the other with a lean mixture. The high desulphation temperatures which are necessary for the decomposition of the sulphates are thus very largely generated by the oxidation of reducing agents in the storage vessel 5, 7 which is to be desulphated. A temperature increase in comparison with the preceding engine operating phase is necessary, for example, in the application in a motor vehicle, in particular in a motor vehicle which is moving under partial load operating conditions. When necessary, additional storage-vessel heating-up means maybe provided, for example in the form of an electrical heating device for the storage vessel 5, 7 which is to be desulphated.

Two specific desulphation procedures are described with reference to the internal combustion engine systems as shown in the two figures, said procedures being based on the underlying idea, explained above, of operating some of the engine cylinders 1 to 4 with a rich mixture and some with a lean mixture and as a result simultaneously making available adequate quantities of reducing agent and oxygen in the overall exhaust emissions, the reducing agent and the oxygen reacting on the surface of the catalytic material of the $NO_x$ adsorber 5 and/or of the $SO_x$ trap 7 and heating it up. For the input of energy which is determined by the quantity of reducing agent and the quantity of oxygen, the quantity of heat which is released can be influenced directly and the temperature which is optimum for desulphation can be set between 550° C. and 700° C. in the storage vessel 5, 7. In addition, by suitably varying the quantities of reducing agent and oxygen the fuel/air ratio which is optimum for desulphation can be set in the range between 1=0.75 and 1=0.99 of the exhaust-emission composition present in the storage vessel 5, 7 by means of the engine management system. These conditions can be implemented particularly advantageously by means of the two method variants described below, by means of specific engine control measures while largely keeping constant the torque which is output by the engine. By way of example, it is advantageous in this regard, without limiting the generality, to select, in each case, a division of the four cylinders 1 to 4 shown into a first pair ⅔ of cylinders 2 an 3 which are operated with a rich, sub-stoichiometric fuel/air ratio 1<1, and a second pair ¼ of cylinders 1 and 4 which are operated with a lean, super-stoichiometric fuel/air ratio 1>1.

The two method variants have in common the fact that during an initial storage-vessel heating-up phase of the respective desulphation period, the pair of cylinders ¼ with the large air excess and the pair of cylinders ⅔ with a severe deficiency of air are operated, i.e. a relatively large distance is selected between the fuel/air ratio of the cylinders ⅔ which are operated with a rich mixture and that of the cylinders ¼ which are operated with a relatively lean mixture, in order to heat up as quickly as possible the storage vessel 5, 7 which is to be desulphated. In this context, overall a stoichiometric set point value of the overall fuel/air ratio is maintained in the storage-vessel heating-up phase in order to ensure an optimum degree of efficiency for the functioning of a three-way catalytic converter which is integrated in the $NO_x$ adsorber catalytic converter or can be implemented in a separate three-way catalytic converter (not shown). This also ensures optimum exhaust emission control during the storage-vessel heating-up phase.

A temperature sensor 8 or 11a which is arranged downstream of the storage vessel 5, 7 which is to be desulphated is used to detect the time at which the optimum desulphation temperature is reached, which can alternatively be carried out by means of a model calculation, dispensing with this temperature sensor. The model calculation can be carried out here by determining the quantity of heat which has been input into the storage vessel 5, 7 which is to be desulphated, said determination for its part being performed by means of the exhaust emission mass fed through the engine 6a, 6b and the exhaust emission temperature measured using a temperature sensor 11 which is arranged upstream of the storage vessel 5, 7 which is to be desulphated. In the subsequent desulphation mode, the pair of cylinders ¼ is then operated with only a slight air excess and the pair of cylinders ⅔ is operated with a slight deficiency of air in comparison with a rich overall fuel/air ratio of between 1=0.75 and 1=0.99 which is aimed at for the desulphation, with the result that the temperature in the storage vessel 5, 7 which is to be desulphated remains at the high level necessary for desulphation, but does not rise further, consequently avoiding thermal damage to the $NO_x$ storage vessel 5 and/or the $SO_x$ trap 7. This means that the rich/lean spread, i.e. the distance between the fuel/air ratio of the cylinders which are operated with a rich mixture with respect to that of the cylinders which are operated with a leaner mixture is reduced in comparison with the heating-up phase. For this purpose, at the transition from the heating-up phase to the actual desulphation mode, the fuel/air ratio of the cylinders which are operated with a leaner mixture is displaced in the rich direction, i.e. to a value just below 1=1, while the fuel/air ratio for the cylinders which are operated with a rich mixture are displaced to a lesser degree in the rich direction, or kept constant or even displaced somewhat in the lean direction. Depending on the application, this rich/lean spread can be reduced according to an incremental or continuous function which can be predefined as desired, with the a rising temperature of the storage vessel, so that, correspondingly, less reducing agent is converted with oxygen accompanied by the generation of heat. This permits, on the one hand, a rapid heating up of the storage vessel, and on the other hand avoids overheating of the storage vessel, an adequate quantity of reducing agent being made available during the actual desulphation.

The setting of the overall fuel/air ratio which is present in the storage vessel 5, 7 which is to be desulphated takes place in the form of an adjustment to a set point value which, in comparison with the heating-up phase is displaced in the rich direction and lies between 1=0.75 and 1=0.99. The feeding back of the regulating function is carried out by means of a lambda probe 10 which lies upstream of the storage vessel 5, 7 which is to be desulphated, in a single-flow section of the exhaust emission tract, in which the streams of exhaust emission of all four cylinders 1 to 4 are combined.

The desulphation is then continued for a specific minimum period which can be determined, for example, in pre-trials and is dependent in each case on the specific instantaneous values of the desulphation parameters, in particular on the storage vessel temperature sensed by means of the respective temperature sensor 11, the set storage-vessel fuel/air ratio sensed by the lambda probe 10, and on the mass flow of the exhaust emissions. After desulphation has taken place, it is possible, for example, to evaluate its quality for the desulphated $NO_x$ adsorber 5 by subsequently testing its $NO_x$ storage capacity by comparing the measured $NO_x$ desorption period with the theoretically calculated desorption period.

In order to permit the desulphation process to proceed with the smallest possible disruption of the normal operation of the engine, one objective of the two specific method variants consists in not causing any abrupt changes to the overall torque of the engine 6a, 6b during the desulphation periods, but instead in compensating the different mixture calorific values of the lean and rich fuel/air ratios in such a way that very largely identical torques are preferably output at all the cylinders 1 to 4.

In a first method variant, such as is possible specifically in the internal combustion engine system in FIG. 1, this is carried out by cylinder-specific setting of the quantity of air. For this purpose, each cylinder 1 to 4 is assigned a separate intake tract with separate throttle valve 12a to 12d. The throttle valves 12a to 12d are actuated individually by an engine controller 13 which controls the operation of the internal combustion engine 6a and of the associated exhaust emission control system, and to which, for this purpose, the output signals of the aforesaid temperature and lambda sensors 8, 10, 11 are fed. In addition, the engine controller 13 individually regulates the ignition time for each cylinder 1 to 4, via an associated ignition control line 14.

In this method example, during the desulphation the throttle valves 12a, 12d of the pair of cylinders ¼ which are operated with a lean mixture are opened further than the throttle valves 12b, 12c of the pair of cylinders ⅔ which are operated with a rich mixture, as a result of which different quantities of air, i.e. cylinder charges, are correspondingly implemented for the two pairs of cylinders ¼, ⅔. Because in this case the torque which is output by each cylinder 1 to 4 is regulated by means of the cylinder charge level, it is possible to select for the respective fuel/air ratio an optimum ignition time for each cylinder 1 to 4, which ensures a comparatively low level of fuel consumption and a good degree of smooth running of the engine 6a.

Alternatively to the example shown of, in each case, one throttle valve 12a to 12d for each cylinder 1 to 4, it is sufficient to provide one throttle valve for each of the pairs of cylinders ¼ and ⅔, respectively, which are operated with different fuel/air ratios, with the result that just two throttle valves are required for a four-cylinder engine. As a further alternative, the different cylinder charge for the subset of the engine cylinders which are operated with a rich mixture on the one hand and the remaining subset of the engine cylinders which are operated with a lean mixture can also be implemented by means of a cylinder-specific, variable inlet-valve controller without the necessity of one or more throttle valves, for which reason it is suitable to select different valve control times for the cylinders which are operated with a lean mixture and for the cylinders which are operated with a rich mixture.

To give a typical numerical example, in this first method variant it is possible during a heating-up phase with approximately stoichiometric overall fuel/air ratio for the subset of the cylinders which are operated with a lean mixture to select a fuel/air ratio of 1=1.33, and set a ratio of 1=0.75 for the cylinders which are operated with a rich mixture. In comparison to the stoichiometric operation at the same engine operating point, the quantity of air for the cylinders which are operated with a rich mixture can remain unchanged, while for the cylinders operated with a lean mixture it is increased by approximately 25%. At the same time, in comparison to the stoichiometric operation the quantity of fuel for the cylinders which are operated with a rich mixture is increased by approximately 33%, while for the lean cylinders it is reduced by 7%. An ignition time which is optimum in terms of combustion can be selected for all the cylinders.

According to a second method variant, such as is suitable for the internal combustion engine system in FIG. 2, for example, a uniform cylinder charge is selected for all the cylinders 1 to 4, even during the desulphation. This procedure consequently requires only one common throttle valve 15 for all the cylinders 1 to 4. Said throttle valve 15 is in turn controlled by an engine controller 13a to which the various sensor output signals are fed and which regulates the ignition time for each cylinder 1 to 4 individually by means of an associated ignition control line 14a. In addition, it regulates the fuel injection procedure for the individual cylinders 1 to 4, as does the engine controller 13 in FIG. 1.

With a cylinder charge which is thus the same for all the cylinders 1 to 4, the lean operation of the one pair of cylinders ¼ is brought about by merely injecting a substoichiometric quantity of fuel, and the rich operation of the other pair of cylinders ⅔ is brought about by injecting a higher, super-stoichiometric quantity of fuel. Owing to the identical cylinder charge in all the cylinders 1 to 4, the pair of cylinders ⅔ which are operated with a rich mixture would, without further measures, output a higher torque than the pair of cylinders ¼ which are operated with a lean mixture because of the higher mixture calorific value of the substoichiometric, rich mixture. This torque excess of the pair of cylinders ⅔ which is operated with a rich mixture in comparison with the pair of cylinders ¼ which is operated with a lean mixture is then compensated by adjusting in the retarded direction the ignition time for the cylinders ⅔ which are operated with a rich mixture. This selection of a retarded ignition time causes the combustion for the pair of cylinders ⅔ which are operated with a rich mixture to take place relatively late in the expansion cycle, as a result of which the combustion efficiency is degraded and the output torque is reduced for a quantity of fuel which remains the same. In this way, a uniform torque output can be implemented at all the cylinders. A further effect with this method variant is that the exhaust emission temperature rises greatly as a result of the late point of concentration of the combustion for the pair of cylinders ⅔ which are operated with a rich mixture, which promotes rapid heating up of the storage vessel which is to be desulphated, here the SO$_x$ trap 7, to the desired desulphation temperature.

As an alternative to the described complete cylinder-specific adaptation of torque during the respective desulphation period, it is, of course, possible to dispense with such adaptation of the torque or to perform adjustment only to such an extent that in the case of the application in a motor vehicle the driving comfort is not persistently degraded by the desulphation operation.

To give a numerical example for the second method variant also, it is possible, given an overall fuel/air ratio which is also kept at the stoichiometric value during a heating-up phase here, to select a fuel/air ratio of 1=1.33 for the cylinders which are operated with a lean mixture, and a fuel/air ratio of 1=0.8 for the cylinders which are operated with a rich mixture. Given the uniform cylinder charge required, this is achieved by selecting a quantity of air which is identical for all the cylinders and which is increased by approximately 25% in comparison with the stoichiometric operation, and a quantity of fuel which is reduced by 7% in comparison with the stoichiometric operation for the cylinders which are operated with a lean mixture, and a quantity of fuel which is increased by approximately 57% for the cylinders which are operated with a rich mixture. While the ignition time for the cylinders which are operated with a rich mixture is, as mentioned, adjusted in the retarded direction, an ignition time which is optimum for the combustion can be selected for the cylinders which are operated with a lean mixture.

In all the cases described above, if control errors of the overall fuel/air ratio occur deviating from the predefined set point value, these errors can be eliminated by changing the fuel/air ratio in all the cylinders or else alternatively by changing the fuel/air ratio of either just the cylinders which are operated with a rich mixture or just those which are operated with a lean mixture. In the latter case, the fuel/air ratio for the respective other cylinders can be held to a constant value while the overall fuel/air ratio is being regulated, which simplifies the complexity of the regulating operation and the hardware which is required for it. Of course, the set point value for the overall fuel/air ratio can be predefined variably over the entire desulphation period in any desired way depending on the application, in particular during an initial heating-up phase it can be predefined to be leaner than during a subsequent desulphation operation after a raised desulphation temperature has been reached, or else can be predefined to remain constant. In addition, reference is made once more to the reduction, which is also possible in all cases and is discussed above, of the rich/lean spread between the fuel/air ratio values for the cylinders which are operated with a rich mixture on the one hand and the cylinders which are operated with a lean mixture on the other, with a rising temperature of the storage vessel which is to be desulphated. In particular, it is possible during the storage-vessel heating-up phase to select a first, relatively high distance value and a different, lower distance value during the subsequent desulphation operation.

What is claimed is:

1. A method for periodically desulphating at least one of a nitrogen oxide storage vessel and a sulphur oxide storage vessel of an exhaust emission control system of a multi-cylinder internal combustion engine, comprising the steps of:

setting a first rich fuel/air ratio for a first subset of the engine cylinders;

setting a second fuel/air ratio for a second, remaining subset of the engine cylinders, the second fuel/air ratio being leaner than the first fuel air/ratio;

feeding an engine exhaust emission including a reducing agent and oxygen to the at least one of the nitrogen oxide storage vessel and the sulphur oxide storage vessel during a desulphation period;

during an initial storage vessel heating-up phase, setting a difference between the first fuel/air ratio and the second fuel/air ratio to a first level; and after a predefined desulphation temperature is reached, setting the difference between the first fuel/air ratio and the second fuel/air ratio to a second level, the second level being lower than the first level.

2. The method according to claim 1, further comprising the steps of:

regulating an entire fuel/air ratio for the total exhaust gas emitted by the engine during a respective desulphation period to a set point value, the set point value being predefined as one of a variable and a constant; and eliminating control errors by counteractive modification of one of the first rich fuel/air ratio and the second leaner fuel/air ratio, the one of the first fuel/air ratio and the second fuel/air ratio not modified being kept constant.

3. The method according to claim 1, wherein the first rich fuel/air ratio and the second leaner fuel/air ratio are set using different air and fuel flow rates for the first and second cylinder subsets, the first subset having an air flow rate which at maximum corresponds approximately to stoichiometric operation and a fuel flow rate which is higher than stoichiometric operation, and the second subset having a fuel flow rate which at maximum corresponds approximately to stoichiometric operation and an air flow rate which is higher than stoichiometric operation.

4. The method according to claim 2, wherein the first rich fuel/air ratio and the second leaner fuel/air ratio are set using different air flow rates for the first and second cylinder subsets, the first subset having an air flow rate which at maximum corresponds approximately to stoichiometric operation and a fuel flow rate which is higher than stoichiometric operation, and the second subset having a fuel flow rate which at maximum corresponds approximately to stoichiometric operation and an air flow rate which is higher than stoichiometric operation.

5. The method according to claim 1, further comprising the steps of:

setting the first rich fuel/air ratio and the second leaner fuel/air ratio at equal fuel/air flow rates which are higher than stoichiometric operation; and adjusting the ignition time in a retarded direction;

wherein the second subset has a fuel flow rate which at maximum corresponds approximately to stoichiometric operation, and the first subset has a fuel flow rate higher than stoichiometric operation.

6. The method according to claim 2, further comprising the steps of:

setting the first rich fuel/air ratio and the second leaner fuel/air ratio at equal fuel/air flow rates which are higher than stoichiometric operation; and adjusting the ignition time in a retarded direction;

wherein the second subset has a fuel flow rate which at maximum corresponds approximately to stoichiometric operation, and the first subset has a fuel flow rate higher than stoichiometric operation.

7. A device for periodically desulphating at least one of a nitrogen oxide storage vessel and a sulphur oxide storage vessel of an exhaust emission cleaning system of a multi-cylinder internal combustion engine, comprising:

at least one throttle valve assigned to at least one cylinder; and a control arrangement for feeding an engine exhaust emission containing a reducing agent and oxygen to at least one of the nitrogen oxide storage vessel and the sulphur oxide storage vessel during a desulphation period, the control arrangement setting a first rich fuel/air ratio for a first subset of the engine cylinders and setting a second leaner fuel/air ratio for a second, remaining subset of the engine cylinders, the control arrangement actuating the at least one throttle valve assigned to the first subset of the engine cylinders in a first manner and actuating the at least one throttle valve assigned to the second subset of the engine cylinders in a second manner different from the first manner.

8. A device for periodically desulphating at least one of a nitrogen oxide storage vessel and a sulphur oxide storage vessel of an exhaust emission cleaning system of a multi-cylinder internal combustion engine, comprising:

a common throttle valve for all the cylinders; and a control arrangement for feeding an engine exhaust emission containing a reducing agent and oxygen to the at least one of the nitrogen oxide storage vessel and the sulphur oxide storage vessel during a desulphation period, the control arrangement setting a first rich fuel/air ratio for a first subset of the engine cylinders and setting a second leaner fuel/air ratio for a second, remaining subset of the engine cylinders, the control arrangement controlling the quantity of fuel injected for the first subset of the engine cylinders according to a first manner and controlling the quantity of fuel injected for the second subset of the engine cylinders according to a second manner different from the first manner;

wherein during an initial storage vessel heating-up phase, the control arrangement sets a difference between the first rich fuel/air ratio and the second leaner fuel/air ratio to a first level; and wherein after a predefined desulphation temperature is reached, the control arrangement sets the difference between the first rich fuel/air ratio and the second leaner fuel/air ratio to a second level, the second level being lower than the first level.

* * * * *

UNITED STATES PATENT AND TRADEMARK OFFICE
CERTIFICATE OF CORRECTION

PATENT NO. : 6,318,075 B1  
DATED : November 20, 2001  
INVENTOR(S) : Günther et al.

It is certified that error appears in the above-identified patent and that said Letters Patent is hereby corrected as shown below:

Column 6,  
Line 34, change "maybe" to -- may be --;  
Line 64, change "⅔" to -- 2/3 --;  
Line 65, change "¼" to -- 1/4 --;

Column 7,  
Line 3, change "¼" to -- 1/4 --;  
Line 4, change "⅔" to -- 2/3 --;  
Line 6, change "⅔" to -- 2/3 --;  
Line 8, change "¼" to -- 1/4 --;

Column 8,  
Line 43, change "¼" to -- 1/4 --;  
Line 45, change "⅔" to -- 2/3 --;  
Line 48, change "¼, ⅔" to -- 1/4, 2/3 --;  
Line 58, change "¼ and ⅔" to -- 1/4 and 2/3 --;

Column 9,  
Line 36, change "¼" to -- 1/4 --;  
Line 38, change "⅔" to -- 2/3 --;  
Line 41, change "⅔" to -- 2/3 --;  
Line 43, change "¼" to -- 1/4 --;  
Line 46, change "⅔" to -- 2/3 --;  
Line 47, change "¼" to -- 1/4 --;  
Line 49, change "⅔" to -- 2/3 --; and  
Line 60, change "⅔" to -- 2/3 --.

Signed and Sealed this

Thirtieth Day of July, 2002

*Attest:*

*Attesting Officer*

JAMES E. ROGAN  
*Director of the United States Patent and Trademark Office*